(12) United States Patent
Cai et al.

(10) Patent No.: US 12,573,186 B2
(45) Date of Patent: Mar. 10, 2026

(54) INTELLIGENT SAFETY SUPERVISION SYSTEM APPLIED TO SHIP

(71) Applicant: Chengdu University of Technology, Sichuan (CN)

(72) Inventors: Dongsheng Cai, Sichuan (CN); Qi Huang, Sichuan (CN); Jian Li, Sichuan (CN)

(73) Assignee: CHENGDU UNIVERSITY OF TECHNOLOGY, Sichuan (CN)

( * ) Notice: Subject to any disclaimer, the term of this patent is extended or adjusted under 35 U.S.C. 154(b) by 379 days.

(21) Appl. No.: 18/236,859

(22) Filed: Aug. 22, 2023

(65) Prior Publication Data

US 2025/0069378 A1 Feb. 27, 2025

(30) Foreign Application Priority Data

Apr. 13, 2023 (CN) .......................... 202310395916.0

(51) Int. Cl.
*G06V 10/778* (2022.01)
*A62C 3/10* (2006.01)
(Continued)

(52) U.S. Cl.
CPC .............. *G06V 10/778* (2022.01); *A62C 3/10* (2013.01); *G06V 10/806* (2022.01); *G06V 10/82* (2022.01);
(Continued)

(58) Field of Classification Search
None
See application file for complete search history.

(56) References Cited

U.S. PATENT DOCUMENTS 9,896,170 B1 * 2/2018 Assal ..................... G06V 40/23
2011/0276305 A1 11/2011 Rinnan et al.

FOREIGN PATENT DOCUMENTS

KR 102145385 B1 8/2020

OTHER PUBLICATIONS

Cheng et al., "Summary of Researching the Ship Safety Navigation Monitoring System Based on the Attitude Measurement", Journal of Guangshou Maritime College, vol. 20, No. 2, 3 pages, with English Language Abstract (Jun. 2012).

(Continued)

*Primary Examiner* — Chan S Park
*Assistant Examiner* — Elisa M Rice
(74) *Attorney, Agent, or Firm* — BLANK ROME LLP

(57) ABSTRACT

An intelligent safety supervision system applied to a ship is provided. An image acquisition module acquires high-definition images in real time. An automatic recognition module obtains ship dynamic and static data. A ship server performs feature recognition on the ship dynamic and static data to obtain a data processing result, transmits the ship dynamic and static data and the data processing result, and receives alarm indication information. An alarm module outputs an alarm. A ship client displays the data processing result, and determines whether to transmit the alarm indication information according to the data processing result. A communication module receives and transmits the ship dynamic and static data and the data processing result. A shore-side supervision system includes a ship safety supervision big data analysis platform for performing secondary feature recognition on the ship dynamic and static data, so as to obtain a secondary data processing result.

9 Claims, 3 Drawing Sheets

(51) Int. Cl.
| | |
|---|---|
| *G06V 10/80* | (2022.01) |
| *G06V 10/82* | (2022.01) |
| *G06V 20/52* | (2022.01) |
| *G08B 21/18* | (2006.01) |
| *G08B 31/00* | (2006.01) |

(52) U.S. Cl.
CPC ........... *G06V 20/52* (2022.01); *G08B 21/182* (2013.01); *G08B 31/00* (2013.01)

(56) References Cited

OTHER PUBLICATIONS

First Office Action for Chinese Application No. 202310395916.0, mailed Nov. 13, 2024, with English language translation.

* cited by examiner

INTELLIGENT SAFETY SUPERVISION SYSTEM APPLIED TO SHIP

CROSS-REFERENCE TO RELATED APPLICATION

This patent application claims the benefit and priority of Chinese Patent Application No. 2023103959160 filed with the China National Intellectual Property Administration on Apr. 13, 2023, the disclosure of which is incorporated by reference herein in its entirety as part of the present application.

TECHNICAL FIELD

The present disclosure relates to the technical fields of Internet, artificial intelligence and safe operation of ships, in particular to an intelligent safety supervision system applied to a ship.

BACKGROUND

Ship supervision is an important part of the management safety category of the ship industry. There are two main ways to deal with the surveillance video deployed on the ship.

(1) The shipping company requires the captain to monitor the operation of each position of the ship in real time, and to stop the violation immediately if there is any violation. The captain is also required to check the surveillance video of the previous day every day and fill in the "Inspection Record of Daily Surveillance Video of Ships" for future reference.

(2) Shore-based safety management personnel of the shipping company remotely receive the surveillance video data of ships in navigation through a satellite network, and manually search and screen irregular and unsafe situations in the data.

It can be found that the current handling of surveillance video data depends entirely on personnel to judge various behaviors and states, which consumes a lot of manpower, resulting in high operating cost and low efficiency, with serious security risks.

In recent years, with the help of video surveillance systems and Internet systems, remote supervision is developed to achieve the whole process of video recording and improve the coverage rate of supervision and inspection. However, there are also some problems, such as the inability to supervise accurately at close range and from multiple angles, the inability to analyze intelligently online in real time, and the lack of early warning. The safety supervision system still needs further innovation.

SUMMARY

An objective of some embodiments of the present disclosure is to provide an intelligent safety supervision system applied to a ship, so as to achieve online real-time supervision and early warning of the ship, and to improve the supervision efficiency.

To achieve the above objective, the embodiments of the present disclosure provide the following solutions.

An intelligent safety supervision system applied to a ship includes a ship-side supervision system, and a shore-side supervision system.

The ship-side supervision system includes:

an image acquisition module, configured to acquire high-definition images in real time;

an automatic recognition module, configured to obtain ship dynamic data and ship static data by a deep learning algorithm of a convolution neural network at least according to the high-definition images;

a ship server, connected to the automatic recognition module, and configured to:

perform feature recognition on the ship dynamic data and the ship static data to obtain a data processing result, transmit the ship dynamic data, the ship static data and the data processing result, and receive alarm indication information;

an alarm module, connected to the ship server, and configured to output an alarm according to the alarm indication information;

a ship client, connected to the ship server, and configured to:

display the data processing result, determine whether to transmit the alarm indication information according to the data processing result, transmit the alarm indication information if a feature value in the data processing result is greater than or equal to a first preset threshold value, and transmit normal operation information if the feature value in the data processing result is less than the first preset threshold value; and a communication module, connected to the ship server, and configured to transmit and receive the ship dynamic data, the ship static data and the data processing result.

The shore-side supervision system includes:

a ship safety supervision big data analysis platform, configured to:

perform secondary feature recognition on the ship dynamic data and the ship static data using the deep learning algorithm of the convolution neural network, so as to obtain a secondary data processing result.

Alternatively, the ship-side supervision system further includes:

a fire monitoring module, connected to the ship server, and configured to:

obtain the alarm indication information, smoke data, water pressure data and water level data of the ship, and transmit the smoke data, the water pressure data and the water level data of the ship, and perform fire extinguishing according to the alarm indication information.

Alternatively, the shore-side supervision system further includes:

a land server, connected to the communication module, and configured to:

receive the ship dynamic data, the ship static data and the data processing result, and classify and store the ship dynamic data, the ship static data and the data processing result;

a land client, connected to the ship safety supervision big data analysis platform, and configured to:

display the ship dynamic data, the ship static data, the data processing result and the secondary data processing result, determine whether to transmit the alarm indication information according to the secondary data processing result, transmit the alarm indication information if a feature value in the secondary data processing result is greater than or equal to the first preset threshold value; and transmit the normal operation information if the feature value in the secondary data processing result is less than the first preset threshold value.

Alternatively, the ship dynamic data includes at least one of ship fire data, staff on-duty data, ship position data, ship velocity data, ship course data, the smoke data, the water pressure data and the water level data;

the ship static data includes at least one of a ship name, a call sign, and a ship draft.

Alternatively, the ship-side supervision system further includes:

a master clock, connected to the ship server, and configured to provide a unified time reference for a slave clock on the ship and the ship server.

Alternatively, the ship server includes:

a feature fusion grading unit, configured to grade fusion features under an influence of different factors in the ship dynamic data and the ship static data according to a character feature fusion method, so as to obtain a feature fusion grading, where the different factors comprise: color, illumination, or a pitch angle, and a feature fusion grading function is:

$$f_j = \sum_{i=1}^{U} a_i \eta_i, j = 1, 2, 3, \dots , n;$$

where a number of feature components under the influence of different factors is U, $f_j$ is a fusion feature of a j-th person under the influence of different factors, $\eta_i$ is a feature component prior to fusion, and $a_i$ is a weight of a fusion feature component.

Alternatively, the ship safety supervision big data analysis platform includes:

a prediction unit, configured to predict a current state value based on a prior state value by using a state prediction equation, so as to obtain a priori state estimate value $\hat{x}_{\overline{k}}$; and an update unit, configured to optimize and update the priori state estimate value $\hat{x}_{\overline{k}}$ using a Kalman gain coefficient equation and a state update equation, so as to obtain a posteriori state estimate value $\hat{x}_k$, where the posteriori state estimate value $\hat{x}_k$ is the secondary data processing result.

Alternatively, the state prediction equation is:

$$\hat{X}_{\overline{k}} = A_k \hat{x}_{k-1} + B_k u_k;$$

$$P_{\overline{k}} = A_k P_{k-1} A_k^T + Q;$$

where $P_{\overline{k}}$ is a priori estimation covariance at time k, $P_{k-1}$ is a priori estimation covariance at time K−1; $A_k$ is a state transition matrix; T denotes transposition; Q is a system noise covariance matrix; $\hat{x}_{\overline{k}}$ represents a prior state estimate value at time k, $\hat{X}_{k-1}$ is an optimal estimate at time k−1 for estimating a state at time k; $u_k$ is a state control vector; and $B_k$ is a control variable matrix.

Alternatively, the Kalman gain coefficient equation is:

$$K_k = (P_{\overline{k}} H_k^T)/(H_k P_{\overline{k}} H_k^T + R);$$

where $K_k$ is a Kalman gain, R is a covariance matrix of measurement noise;

the state update equation is:

$$\hat{x}_k = \hat{x}_{\overline{k}} + K_k(z_k - H_k \hat{x}_{\overline{k}});$$

$$P_k = (I - K_k H_k) P_{\overline{k}};$$

where $\hat{x}_k$ is a posteriori state estimate value at time k; $P_k$ is a posteriori estimation covariance at time k; $z_k$ is a measurement vector; $H_k$ is a transformation matrix from a state vector to a measurement vector; and I is an identity matrix.

In accordance with an embodiment of the present disclosure, the image acquisition module is configured to acquire high-definition images at close range and from multiple angles in real time. The automatic recognition module is configured to perform feature recognition on a large number of high-definition images. Therefore, the intellectualization and automation of supervision and monitoring are achieved, a traditional operation mechanism that depends entirely on personnel to judge various behaviors and states is changed, and a large amount of manpower is saved.

The alarm module is configured to output an alarm to maximize the reminding effect. The high-definition images can record the normal behaviors of staff to form personnel attendance and work records, which is convenient for ship management personnel to perform data analysis. According to the present disclosure, online real-time supervision and early warning of the ship are achieved, and the supervision efficiency is improved.

The communication module is connected to the ship server, and configured to receive and transmit the ship dynamic data, the ship static data and the data processing result, and to classify data transmission and data reception, thus ensuring a stable operation of a high-speed data backhaul function in a weak network environment, and ensuring the continuity and stability of data backhaul during ship navigation.

The ship safety supervision big data analysis platform achieves the secondary recognition of features, and thus improves the accuracy of feature recognition.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

REFERENCE NUMERALS

1—image acquisition module, 2—automatic recognition module, 3—ship server, 4—ship client, 5—fire monitoring module, 6—master clock, 7—alarm module, 8—communication module, 9—ship safety supervision big data analysis platform.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of embodiments of the present disclosure is to provide an intelligent safety supervision system applied to a ship, so as to solve the problem that the current processing of surveillance video data that depends entirely on personnel to judge various behaviors and states consumes a lot of manpower, resulting in a high operating cost, low efficiency, and the existence of serious security risks, and the problems of inability to accurately supervise at close range and from multiple angles, inability to analyze intelligently online in real time, the lack of early warning, and the like.

To make the above objective, features and advantages of the present disclosure clearer and more comprehensible, the present disclosure will be further described in detail below with reference to the accompanying drawings and specific embodiments.

Figure 1:
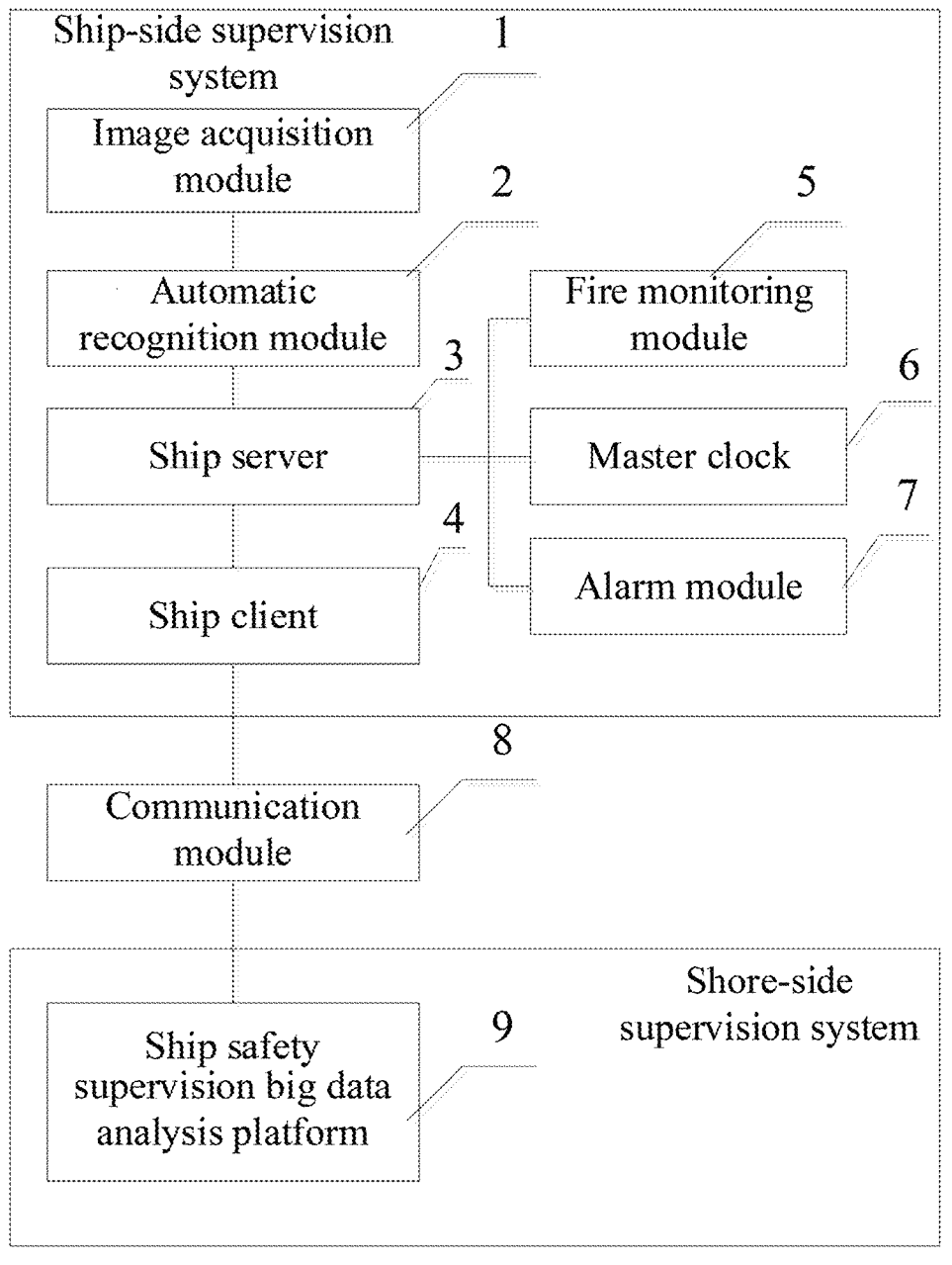
FIG. 1 is a schematic structural diagram of an intelligent safety supervision system applied to a ship in accordance with an embodiment of the present disclosure.

An exemplary structure of an intelligent safety supervision system applied to a ship is shown in FIG. 1. The intelligent safety supervision system includes a ship-side supervision system, and a shore-side supervision system. Various components are described in detail below.

The ship-side supervision system at least includes: an image acquisition module 1, an automatic recognition module 2, a ship server 3, a ship client 4, a fire monitoring module 5, a master clock 6, and an alarm module 7.

The image acquisition module 1 is configured to acquire high-definition images in real time.

In one example, the image acquisition module 1 may specifically be a high-definition explosion-proof camera. The high-definition explosion-proof camera uploads high-definition images within an area in real time. The area includes a range where the high-definition explosion-proof camera rotates to record images.

The automatic recognition module 2 is configured to obtain ship dynamic data and ship static data using a deep learning algorithm of a convolution neural network at least according to the high-definition images.

The ship dynamic data includes at least one of ship fire data, staff on-duty data, ship position data, ship velocity data, ship course data, smoke data, water pressure data, and water level data.

The ship static data includes at least one of a ship name, a call sign and a ship draft.

In one example, the automatic recognition module 2 receives the high-definition images, and thus at least can obtain the staff on-duty data. The automatic recognition module 2 cooperates with a Beidou satellite navigation system and/or a GPS (Global positioning system) to transmit the ship dynamic data such as the ship fire data, the staff on-duty data, the ship position data, the ship velocity data, the ship course data, the smoke data, the water pressure data and the water level data, and the ship static data such as the ship name, the call sign and the ship draft.

The ship server 3 is connected to the automatic recognition module 2 and is configured to:

perform feature recognition on the ship dynamic data and the ship static data to obtain a data processing result, transmit the ship dynamic data, the ship static data and the data processing result, and receive alarm indication information.

In one example, after receiving the ship dynamic data and the ship static data, the ship server 3 performs feature recognition on the ship dynamic data and the ship static data. For example, normal temperature data or abnormal temperature data can be obtained by comparing the ship fire data with a temperature threshold. A normal position or an abnormal position can be obtained by comparing the ship position data with a preset course. A normal velocity or abnormal velocity can be obtained by comparing the ship velocity data with a preset velocity. A normal course or an abnormal course can be obtained by comparing the ship course data with a preset course. Normal smoke data or abnormal smoke data can be obtained by comparing the smoke data with a preset smoke concentration. A normal water pressure or an abnormal water pressure can be obtained by comparing the water pressure data with a preset water pressure. A normal water level or an abnormal water level can be obtained by comparing the water level data with a preset water level. A normal depth or an abnormal depth can be obtained by comparing the ship draft with a preset depth. Normal on-duty or off-post data is obtained by performing face recognition on the staff on-duty data.

The data processing result at least includes: the normal temperature data or abnormal temperature data, the normal position or abnormal position, the normal velocity or abnormal velocity, the normal course or abnormal course, the normal smoke data or abnormal smoke data, the normal water pressure or abnormal water pressure, the normal water level or abnormal water level, the normal depth or abnormal depth, and the normal on-duty or off-post data.

Feature recognition includes big data storage analysis and behavior recognition. The big data storage analysis includes massive data models, and natural language processing. The big data storage analysis has the functions of real-time data processing, high-speed data transmission, search, data analysis and the like. The behavior recognition is specifically an image recognition technology. Images of persons talking on the phone, sleeping, not wearing helmets, not wearing workwear, and fighting are acquired, and features about taking on the phone, sleeping, not wearing helmets, not wearing workwear, fighting and so on of these persons are extracted by using the deep learning algorithm of the convolution neural network, and then the features about taking on the phone, sleeping, not wearing helmets, not wearing workwear, fighting and so on are matched with biological features in a database to get the data processing result.

The ship server 3 includes at least a feature fusion grading unit.

The feature fusion grading unit is configured to grade fusion features under the influence of different factors in the ship dynamic data and the ship static data according to a character feature fusion method, so as to obtain a feature fusion grading. The different factors include: color, illumination, or a pitch angle, and a feature fusion grading function is:

$$f_j = \sum_{i=1}^{U} a_i \eta_i, \, j = 1, 2, 3, \ldots, n;$$

where the number of feature components under the influence of different factors is U, $f_j$ is a fusion feature of a j-th person under the influence of different factors, $\eta_i$ a feature component prior to fusion, and $a_i$ is a weight of a fusion feature component.

In one example, according to the character feature fusion method, the fusion features under the influence of different factors in the staff on-duty data are graded, so as to obtain the feature fusion grading.

The ship server 3 can also perform data compression and network segmentation on the high-definition images, and then display the high-definition images on a display screen immediately. The network segmentation can at least be based on time segmentation.

The feature fusion grading unit may be composed of a high-performance parallel computing server and a high-speed graphics processor, which can automatically recognize the behavior of the staff and encode the high-definition images.

According to an embodiment of the present disclosure, in the aspect of personnel supervision, a technology based on face recognition and edge differential adaptive dynamic tracking is adopted. The deep learning method of the convolution neural network is adopted for face recognition, which can accurately identify effective features through a large number of trainings, and make optimization for complex scenes such as cabin passages, so as to improve face recognition speed and accuracy by using the high-speed operation performance of the graphics processor. When a staff enters a working area, the feature fusion grading unit can perform "senseless" personnel punching in and tracking and positioning of the staff. During the working hours, behaviors of the staff, such as whether the staff wears the helmet, whether the staff is absent, whether the staff fights, and whether the staff sleeps, are recorded. During the non-working hours, the feature fusion grading unit performs "senseless" personnel punching out for the personnel leaving the working area.

The recognition of fighting in the area is to detect and capture human posture results according to key points of a human body, and then to detect whether there is a fighting behavior. The recognition for the wearing of the helmet is that there are personnel not wearing the helmet in a monitoring range of a specified camera. The recognition of illegal use of mobile phones in the workplace is that there are personnel talking on the phone in the monitoring range of the specified camera. The recognition of a sleeping behavior in a cab is that a suspected sleeping behavior (motionless and in a daze) lasts for 5 minutes. The recognition of absence in the cab is according to records in access cards of all staff in the cab, if no new staff member punches in within 5 minutes, an absence early-warning is given.

The early-warning behavior also includes statistics of embarking and disembarking personnel, and early warning of personnel on duty being disturbed. The statistics of embarking and disembarking personnel are used for the behaviors such as identifying the personnel who are not allowed to board the ship, and counting the disembarking of all non-crew members when departing. The early warning of personnel on duty being disturbed is used for the behaviors that off-duty personnel chat at a bridge, or a driver does work unrelated to the duty.

Based on the face recognition technology, a non-early warning behavior can make statistics and records of personnel attendance, regular meetings and drills. Attendance including automatically recording the working hours of the staff in a designated workplace, whether the captain and chief engineer stick to their posts under the specified conditions, and whether the personnel on duty are handed over on time, is used to count the working hours of the relevant staff in an engine room and at the bridge. Regular meeting including selecting relevant staff to attend the meeting according to the requirements of the company, is used to ensure that relevant staff participate on time. Drill including developing life-saving fire drills according to the requirements of the company, is used to ensure that relevant staff participate and wear workwear and life jackets.

An attendance record includes an early-warning picture with a time stamp and a text description. The text description includes: a personnel name, a time of occurrence, an area, and an early-warning behavior. The export of the early-warning picture and the text description is supported.

The ship server 3 can also classify and store the data processing results for viewing. For example, the data processing results can be classified by time, or normal data class and abnormal data class. Then, the classified data are converted into data matched with the transmission in a satellite broadband dynamic backhaul technology for transmission.

The alarm module 7 is connected to the ship server 3, and is configured to output an alarm according to the alarm indication information.

In one example, the alarm module 7 may be specifically a broadcast universal alarm system. When the face recognition is conducted, dangerous situation or early-warning behavior occurs, the broadcast universal alarm system at least outputs an audio file or a video file for reminding or warning. The dangerous situation refers to fire within the area. The early-warning behavior includes the behaviors such as staff fighting within the area, not wearing a helmet, sleeping in the working area, playing with phones, and absence. The normal behavior includes attendance, regular meetings, drills, etc.

The ship client 4 is connected to the ship server 3, and is configured to:

display the data processing result, determine whether to transmit the alarm indication information according to the data processing result, transmit the alarm indication information if a feature value in the data processing result is greater than or equal to a first preset threshold value, and transmit the normal operation information if the feature value in the data processing result is less than the first preset threshold value.

In one example, the ship client 4 may specifically be a display terminal, such as a display, a computer, and the like. The display is used to display the data processing result. The computer is used to determine whether to transmit the alarm indication information according to the data processing result.

The ship client 4 may also be a mobile terminal, such as a cell phone, a tablet computer, etc. The mobile terminal is used to synchronize recognition results of staff behaviors, and the staff can view the results of attendance, regular meetings, drills and other behaviors through the mobile terminal. For example, the face recognition is conducted for the staff entering the cab, and a voice feedback, a recognition picture with a time stamp and a text description can be synchronized to the mobile terminal during face recognition.

When the ship client 4 is applied to an electronic device in the form of software, in one example, the client may be stand-alone software (e.g., an APP deployed on a terminal), or an operating system or an operating system-level program of the terminal. In addition, it may also be a Mini Program in WeChat or H5 (html5) webpage, etc. It should be noted that "Mini Program" is an application that can be used without downloading and installing.

The communication module 8 is connected to the ship server 3, and is configured to transmit and receive the ship dynamic data, the ship static data and the data processing result.

In one example, the communication module 8 may be specifically a satellite broadband dynamic backhaul technology of a Beidou satellite navigation system or a GPS. In addition, the ship can receive and transmit the ship dynamic data, the ship static data and the data processing result via a wireless data network (5G) when sailing offshore.

Through the satellite broadband dynamic backhaul technology, the data transmission and data reception can be separated without affecting each other. When backhauled, the data are automatically cut and compressed by the system, and is backhauled in a segment of 3 MB at a time, and the data backhaul rate is 0.5 MB/s. After all segments are transmitted, decompression and segment merging are conducted. In the data backhaul process, the system continuously records the progress of data backhaul. If off-line or other anomalies occur, the system automatically queries the data backhaul state and performs breakpoint resume. The stable operation of a high-speed data backhaul function in a weak network environment is ensured, and the continuity and stability of the data backhaul during ship navigation are ensured.

The shore-side supervision system includes a ship safety supervision big data analysis platform 9.

The ship safety supervision big data analysis platform 9 is configured to:

perform secondary feature recognition on the ship dynamic data and the ship static data using the deep learning algorithm of the convolution neural network, so as to obtain a secondary data processing result.

In one example, the secondary feature recognition process of the ship safety supervision big data analysis platform 9 can refer to the feature recognition process of the ship dynamic data and ship static data by the above ship server 3, which will not be repeated here.

A deep learning kernel with gradient adaptive optimization is used for the ship safety supervision big data analysis platform 9, which makes data analysis smoother and thus accelerates training by accumulating squared gradients. In addition, an attenuation coefficient is added to an accumulated result to control the accumulation of historical information, so as to change the learning rate, and solve the problem that the weight cannot be effectively updated as the subsequent learning rate is small. The generalization ability of the training model is improved, and effective features for accurately identifying head postures, occlusion, illumination conditions and facial expressions are formed. The secondary feature recognition achieves more accurate recognition and filters the wrong information of feature recognition.

The ship safety supervision big data analysis platform 9 at least includes a prediction unit and an update unit.

The prediction unit is configured to predict a current state value based on a prior state value by using a state prediction equation, so as to obtain a priori state estimate value $\hat{x}_{\overline{k}}$.

The state prediction equation is as follows:

$$\hat{x}_{\overline{k}} = A_k \hat{x}_{k-1} + B_k u_k;$$
$$P_{\overline{k}} = A_k P_{k-1} A_k^T + Q;$$

where $P_{\overline{k}}$ is a priori estimation covariance at time k, $P_{k-1}$ is a priori estimation covariance at time K−1; $A_k$ is a state transition matrix; T denotes transposition; Q is a system noise covariance matrix; $\hat{x}_{\overline{k}}$ represents a prior state estimate value at time k, $\hat{X}_{k-1}$ is an optimal estimate at time k−1 for estimating a state at time k; $u_k$ is a state control vector; and $B_k$ is a control variable matrix.

The update unit is configured to optimize and update the priori state estimate value $\hat{x}_{\overline{k}}$ using a Kalman gain coefficient equation and a state update equation, so as to obtain a posteriori state estimate value $\hat{x}_k$, where the posteriori state estimate $\hat{x}_k$ is the secondary data processing result.

The Kalman gain coefficient equation is as follows:

$$K_k = \left(P_{\overline{k}} H_k^T\right) / \left(H_k P_{\overline{k}} H_k^T + R\right);$$

where $K_k$ is a Kalman gain, R is a covariance matrix of measurement noise.

The state update equation is as follows:

$$\hat{x}_k = \hat{x}_{\overline{k}} + K_k\left(z_k - H_k \hat{x}_{\overline{k}}\right);$$
$$P_k = \left(I - K_k H_k\right) P_{\overline{k}};$$

where $\hat{x}_k$ is a posteriori state estimate value at time k; $P_k$ is a posteriori estimation covariance at time k; $z_k$ is a measurement vector; $H_k$ is a transformation matrix from a state vector to a measurement vector; and I is an identity matrix.

Due to the problem that there may be a large number of occlusions in the image, the ship safety supervision big data analysis platform 9 adopts a target tracking technology based on Kalman filter and a related filtering algorithm, and the ship safety supervision big data analysis platform 9 may specifically be a Kalman filter. The Kalman filter includes a prediction unit and an update unit, so as to obtain more accurate prediction values. By repeating the Kalman gain coefficient equation and the state update equation above, the optimal value of the current predicted values can be calculated, and a dynamic trajectory of the multi-target position of the staff can be predicted. The ship safety supervision big data analysis platform 9 adapts to various operating conditions in the cabin, deck and stern, greatly improves the success rate of dynamic violation behavior recognition, and provides a solid foundation for an intelligent navigation safety system.

In conclusion, in accordance with an embodiment of the present disclosure, an image acquisition module is configured to acquire high-definition images in close range and from multiple angles in real time. The automatic recognition module is configured to perform feature recognition on a large number of high-definition images. Therefore, the intellectualization and automation of supervision and monitoring are achieved, the traditional operation mechanism that depends entirely on personnel to judge various behaviors and states is changed, and a large amount of manpower is saved.

An alarm module is configured to output an alarm to maximize the reminding effect. The high-definition images can record the normal behaviors of staff to form personnel attendance and work records, which is convenient for ship management personnel to perform data analysis. According to the present disclosure, online real-time supervision and early warning of the ship are achieved, and the supervision efficiency is improved.

A communication module is connected to a ship server. The communication module is configured to receive and transmit ship dynamic data, ship static data and a data processing result, and classify data transmission and data reception, thus ensuring a stable operation of a high-speed data backhaul function in a weak network environment, and ensuring the continuity and stability of data backhauling during ship navigation.

A ship safety supervision big data analysis platform achieves the secondary recognition of features, and thus improves the accuracy of feature recognition.

In other embodiments of the present disclosure, the ship-side supervision system further includes a fire monitoring module 5.

Figure 2:
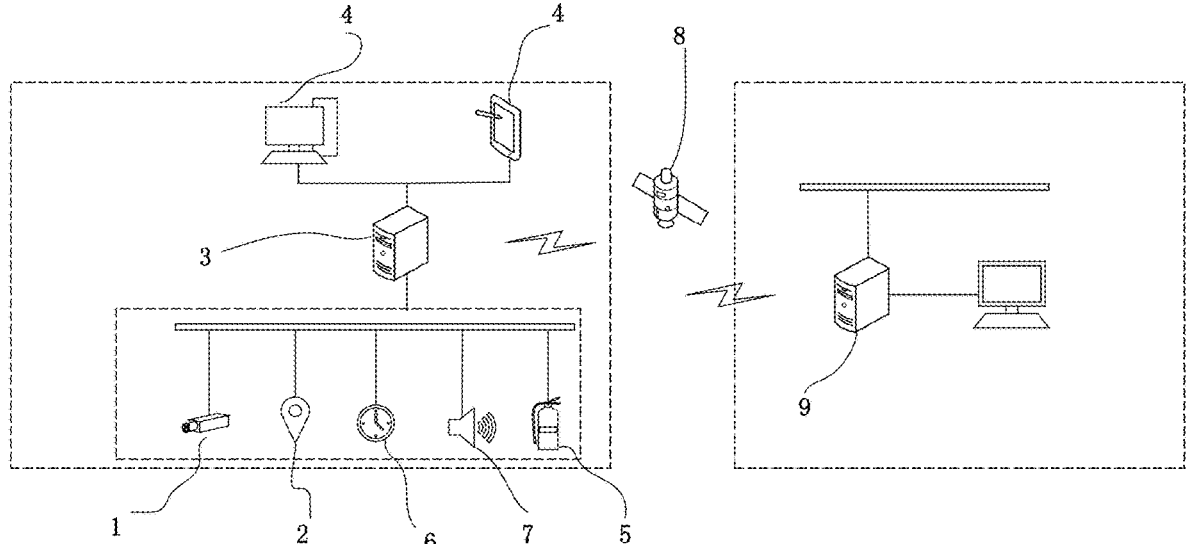
FIG. 2 is a detailed structural diagram of an intelligent safety supervision system applied to a ship in accordance with an embodiment of the present disclosure.

Please referring to FIG. 2, the fire monitoring module 5 is connected to the ship server 3, and is configured to:

obtain the alarm indication information, smoke data, water pressure data and water level data of the ship, and transmit the smoke data, the water pressure data and the water level data of the ship, and perform fire extinguishing according to the alarm indication information.

In one example, the fire monitoring module 5 at least includes an automatic fire alarm sensor, a fire-fighting pool liquid level sensor, a fire-fighting pipe network pressure sensor, an emergency power supply voltage sensor, and an automatic fire extinguishing equipment controller.

The automatic fire alarm sensor has an audible-optical alarm function, and is used to transmit an audible-optical alarm and to upload the alarm indication information to the fire monitoring module 5 when a fire occurs.

The fire-fighting pool liquid level sensor and the fire-fighting pipe network pressure sensor are respectively used to monitor a liquid level in a fire-fighting pool and a pressure of a fire-fighting pipe network in real time and to upload the data to the fire monitoring module 5.

The emergency power supply voltage sensor is used to monitor a power supply voltage in real time, and to upload the voltage data to the fire monitoring module 5.

The automatic fire extinguishing equipment controller includes a water spray fire extinguishing system, a water mist fire extinguishing system, a foam spray fire extinguishing system, an oil discharge and nitrogen injection fire extinguishing system, a gas fire extinguishing system, and the like, which has automatic, manual, alarm indication information remote control and emergency mechanical operation functions.

In other embodiments of the present disclosure, the shore-side supervision system further includes a land server.

The land server is connected to the communication module 8, and configured to:

receive the ship dynamic data, the ship static data and the data processing result, and classify and store the ship dynamic data, the ship static data and the data processing result.

In one example, the land server includes data synchronization and application service.

The data synchronization is used to receive the ship dynamic data, the ship static data and the data processing result transmitted in real time by the satellite broadband dynamic backhaul technology, to classify and store the ship dynamic data, the ship static data and the data processing result, and to support data query and backtracking. Please refer to the above for classification methods.

The application service is used to establish the ship safety supervision big data analysis platform 9, so as to achieve situational awareness and global awareness of the ship safety supervision.

The land client is connected to the ship safety supervision big data analysis platform 9, and is configured to:

display the ship dynamic data, the ship static data, the data processing result and the secondary data processing result, determine whether to transmit the alarm indication information according to the secondary data processing result, transmit the alarm indication information if a feature value in the secondary data processing result is greater than or equal to a first preset threshold value, and transmit normal operation information if the feature value in the secondary data processing result is less than the first preset threshold value.

An overlap rate is obtained by comparing the number of times that the ship safety supervision big data analysis platform 9 transmits the alarm indication information with the number of times that the ship client 4 transmits the alarm indication information. If the overlap rate is greater than or equal to a second preset threshold, an output alarm is accurate. If the overlap rate is less than the second preset threshold, the output alarm is inaccurate.

In one example, the land client is used to manage and display the alarm indication information of all ships in the fleet in real time, so as to achieve the viewing and automatic export of the alarm indication information by ship, scene, type and time.

In other embodiments of the present disclosure, the ship-side supervision system further includes a master clock 6.

The master clock 6 is connected to the ship server, and configured to provide a unified time reference for a slave clock on the ship and the ship server.

Figure 3:
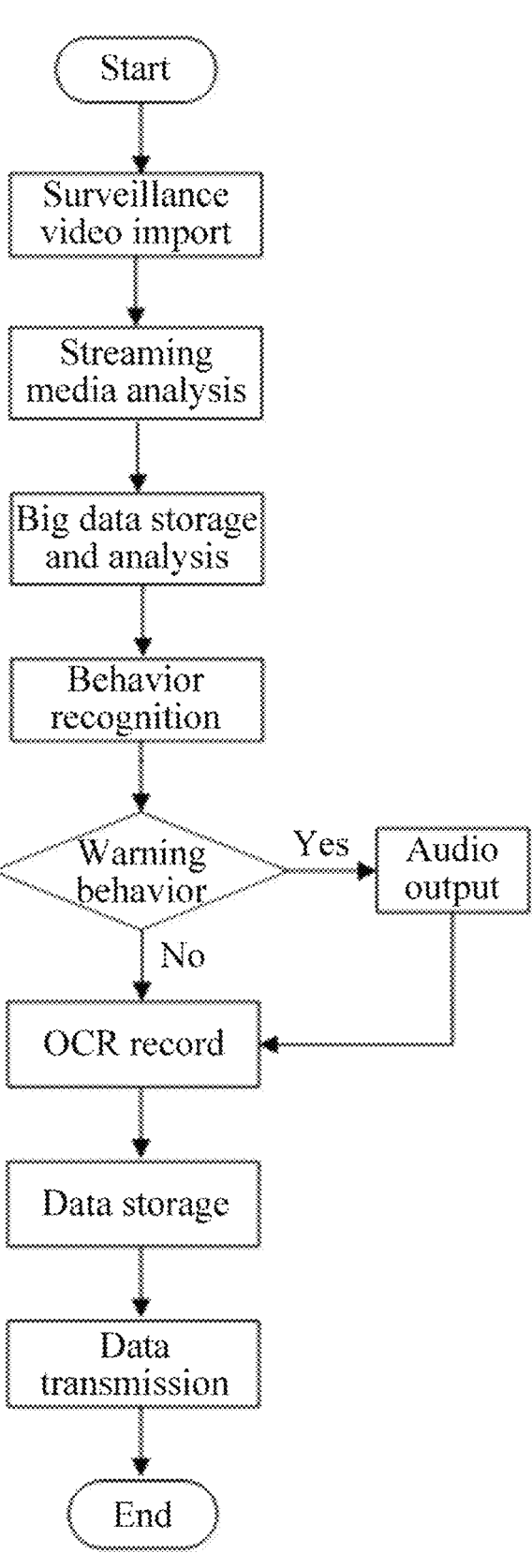
FIG. 3 is a flow diagram of an intelligent safety supervision system applied to a ship in accordance with an embodiment of the present disclosure.

Referring to FIG. 3, the image acquisition module 1 is used to acquire high-definition images in real time (surveillance video import). The automatic recognition module 2 is used to obtain the ship dynamic data and the ship static data (streaming media analysis). The ship server 3 is used to perform feature recognition on the ship dynamic data and the ship static data to obtain the data processing result (big data storage analysis and behavior recognition), and to transmit the ship dynamic data, the ship static data and the data processing result (early warning behavior). In a case of receiving the alarm indication information, the alarm module 7 is used to output an alarm. In a case of not receiving the alarm indication information, an OCR record is performed, and the ship dynamic data, the ship static data and the data processing result are stored. The ship client 4 is used to display the data processing result, to determine whether to transmit the alarm indication information according to the data processing result. The communication module 8 is used to receive and transmit the ship dynamic data, the ship static data and the data processing result (data transmission).

Embodiments in this specification are described in a progressive manner, each embodiment focuses on differences from other embodiments, and the same and similar parts between the embodiments can be referred to each other. Since the system disclosed in the embodiments correspond to the method disclosed in the embodiments, the description thereof is relatively simple, and for relevant matters, references may be made to the description of the method.

In this specification, several examples are used for illustration of the principles and implementation methods of the present disclosure. The description of the foregoing embodiments is merely used to help illustrate the method of the present disclosure and core ideas thereof. In addition, those of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. An intelligent safety supervision system applied to a ship, comprising a ship-side supervision system and a shore-side supervision system;

the ship-side supervision system comprising:
an image acquisition module, configured to acquire high-definition images in real time;
an automatic recognition module, configured to obtain ship dynamic data and ship static data by a deep learning algorithm of a convolution neural network at least according to the high-definition images;
a ship server, connected to the automatic recognition module, and configured to:
perform feature recognition on the ship dynamic data and the ship static data to obtain a data processing result, wherein the feature recognition comprises big data storage analysis and behavior recognition, wherein the data processing result at least comprises: normal temperature data or abnormal temperature data, a normal position or an abnormal position, a normal velocity or an abnormal velocity, a normal course or an abnormal course, normal smoke data or abnormal smoke data, a normal water pressure or an abnormal water pressure, a normal water level or an abnormal water level, a normal depth or an abnormal depth, and normal on-duty or off-post data;
transmit the ship dynamic data, the ship static data and the data processing result, and
receive alarm indication information;
an alarm module, connected to the ship server, and configured to output an alarm according to the alarm indication information;
a ship client, connected to the ship server, and configured to:
display the data processing result,
determine whether to transmit the alarm indication information according to the data processing result,
transmit the alarm indication information if a feature value in the data processing result is greater than or equal to a first predetermined threshold value, and
transmit normal operation information if the feature value in the data processing result is less than the first predetermined threshold value; and
a communication module, connected to the ship server, and configured to transmit and receive the ship dynamic data, the ship static data and the data processing result; and
the shore-side supervision system comprising:
a ship safety supervision big data analysis platform, configured to:

perform secondary feature recognition on the ship dynamic data and the ship static data using the deep learning algorithm of the convolution neural network, so as to obtain a secondary data processing result,
a land client, connected to the ship safety supervision big data analysis platform, and configured to:
display the ship dynamic data, the ship static data, the data processing result and the secondary data processing result,
determine whether to transmit the alarm indication information according to the secondary data processing result,
transmit the alarm indication information if a feature value in the secondary data processing result is greater than or equal to the first predetermined threshold value;
transmit the normal operation information if the feature value in the secondary data processing result is less than the first predetermined threshold value; and
obtaining an overlap rate by comparing a number of times that the ship safety supervision big data analysis platform transmits the alarm indication information with a number of times that the ship client transmits the alarm indication information, wherein in responding to the overlap rate being greater than or equal to a second predetermined threshold, an output alarm is accurate; and in responding to the overlap rate being less than the second preset threshold, the output alarm is inaccurate.

2. The intelligent safety supervision system according to claim 1, wherein the ship-side supervision system further comprises:
a fire monitoring module, connected to the ship server, and configured to:
obtain the alarm indication information, smoke data, water pressure data and water level data of the ship, and transmit the smoke data, the water pressure data and the water level data of the ship, and
perform fire extinguishing according to the alarm indication information.

3. The intelligent safety supervision system according to claim 1, wherein the shore-side supervision system further comprises
a land server, connected to the communication module, and configured to:
receive the ship dynamic data, the ship static data and the data processing result, and classify and store the ship dynamic data, the ship static data and the data processing result.

4. The intelligent safety supervision system according to claim 2, wherein
the ship dynamic data comprises at least one of ship fire data, staff on-duty data, ship position data, ship velocity data, ship course data, the smoke data, the water pressure data and the water level data;
the ship static data comprises at least one of a ship name, a call sign, and a ship draft.

5. The intelligent safety supervision system according to claim 1, wherein the ship-side supervision system further comprises:
a master clock, connected to the ship server, and configured to provide a unified time reference for a slave clock on the ship and the ship server.

6. The intelligent safety supervision system according to claim 1, wherein the ship server comprises:
a feature fusion grading unit, configured to grade fusion features under an influence of different factors in the ship dynamic data and the ship static data according to a character feature fusion method, so as to obtain a feature fusion grading, wherein the different factors comprise: color, illumination, or a pitch angle, and a feature fusion grading function is:

$$f_j = \sum_{i=1}^{U} a_i \eta_i, j = 1, 2, 3, \ldots, n;$$

wherein a number of feature components under the influence of different factors is U, $f_i$ is a fusion feature of a j-th person under the influence of different factors, $\eta_i$ is a feature component prior to fusion, and $a_i$ is a weight of a fusion feature component.

7. The intelligent safety supervision system according to claim 1, wherein the ship safety supervision big data analysis platform comprises:

a prediction unit, configured to predict a current state value based on a prior state value by using a state prediction equation, so as to obtain a priori state estimate value $\hat{x}_{\overline{k}}$; and an update unit, configured to optimize and update the priori state estimate value $\hat{x}_{\overline{k}}$ using a Kalman gain coefficient equation and a state update equation, so as to obtain a posteriori state estimate value $\hat{X}_k$, wherein the posteriori state estimate value $\hat{X}_k$ is the secondary data processing result.

8. The intelligent safety supervision system according to claim 7, wherein the state prediction equation is:

$$\hat{x}_{\overline{k}} = A_k \hat{x}_{k-1} + B_k u_k;$$

$$P_{\overline{k}} = A_k P_{k-1} A_k^N + Q;$$

wherein, $P_{\overline{k}}$ is a priori estimation covariance at time k, $P_{k-1}$ is a priori estimation covariance at time K−1; $A_k$ is a state transition matrix; T denotes transposition; Q is a system noise covariance matrix; $\hat{x}_{\overline{k}}$ represents a prior state estimate value at time k, $\hat{X}_{k-1}$ is an optimal estimate at time k−1 for estimating a state at time k; $u_k$ is a state control vector; and $B_k$ is a control variable matrix.

9. The intelligent safety supervision system according to claim 8, wherein the Kalman gain coefficient equation is:

$$K_k = \left(P_{\overline{k}} H_k^T\right) / \left(H_k P_{\overline{k}} H_k^T + R\right);$$

wherein $K_k$ is a Kalman gain, R is a covariance matrix of measurement noise;

the state update equation is:

$$\hat{x}_k = \hat{x}_{\overline{k}} + K_k\left(z_k - H_k \hat{x}_{\overline{k}}\right);$$

$$P_k = (I - K_k H_k) P_{\overline{k}};$$

wherein $\hat{X}_k$ is a posteriori state estimate value at time k; $P_k$ is a posteriori estimation covariance at time k; $z_k$ is a measurement vector; $H_k$ is a transformation matrix from a state vector to a measurement vector; and I is an identity matrix.

* * * * *